（12）United States Patent
Gormley et al.

(10) Patent No.: US 7,041,528 B2
(45) Date of Patent: May 9, 2006

(54) METHOD FOR FORMING A MICRO-MECHANICAL COMPONENT IN A SEMICONDUCTOR WAFER, AND A SEMICONDUCTOR WAFER COMPRISING A MICRO-MECHANICAL COMPONENT FORMED THEREIN

(75) Inventors: Colin Stephen Gormley, Belfast (IE); Scott Jong Ho Limb, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 37 days.

(21) Appl. No.: 10/617,427

(22) Filed: Jul. 11, 2003

(65) Prior Publication Data

US 2004/0023430 A1 Feb. 5, 2004

Related U.S. Application Data

(60) Provisional application No. 60/396,272, filed on Jul. 16, 2002.

(51) Int. Cl.
*H01L 21/00* (2006.01)
*G02B 26/00* (2006.01)

(52) U.S. Cl. .................. 438/72; 438/667; 359/291; 359/647

(58) Field of Classification Search .............. 438/43, 438/54, 71, 72, 455, 667, 701; 359/291, 359/578, 847
See application file for complete search history.

(56) References Cited

U.S. PATENT DOCUMENTS 6,300,665 B1 * 10/2001 Peeters et al. ............... 257/415
6,341,039 B1 * 1/2002 Flanders et al. ............ 359/578
6,818,564 B1 * 11/2004 Gormley ..................... 438/734

* cited by examiner

*Primary Examiner*—Zandra V. Smith
*Assistant Examiner*—Pamela E Perkins
(74) *Attorney, Agent, or Firm*—Gauthier & Connors LLP (57) ABSTRACT

A method for producing a semiconductor wafer (1) with one or more micro-mirrors (5) formed in a membrane layer (2) which is supported on a handle layer (3) with a buried oxide layer (6) between the membrane and handle layers (2,3) which avoids rupturing of tethers (7) which support the micro-mirrors (5) in the membrane layer (2) and also avoids bowing of the micro-mirrors (5). After trenches (14) are formed in the membrane layer (2) for defining the micro-mirrors (5) and the tethers (7), and prior to forming of through bores (9) through the handle layer (3) to the micro-mirrors (5), a support layer (20) of oxide is deposited on the exposed surface (12) of the membrane layer (2) over the micro-mirrors (5) and the tethers (7) and is back filled into the trenches (14) for supporting bridging portions (16) of the buried oxide layer (6). The buried oxide layer (6) acts as an etch stop layer for the through bores (9), and stresses which are induced in exposed portions (19) of the buried oxide layer (6) exposed by the through bores (9) during etching of the through bores (9) are counteracted by the support layer (20) which prevents rupturing of the bridging portions (16), thereby preventing rupturing of the tethers (7). By counteracting the stresses induced in the exposed portions (19) of the buried oxide layer (6) bowing of the exposed portions (19) is avoided and thus bowing of the micro-mirrors (5) is also avoided.

35 Claims, 4 Drawing Sheets

METHOD FOR FORMING A MICRO-MECHANICAL COMPONENT IN A SEMICONDUCTOR WAFER, AND A SEMICONDUCTOR WAFER COMPRISING A MICRO-MECHANICAL COMPONENT FORMED THEREIN

This application claims the benefit of Provisional Application No. 60/396,272 filed Jul. 16, 2002.

FIELD OF THE INVENTION

The present invention relates to a method for forming a micro-mechanical component in a semiconductor wafer, and in particular to such a method for forming a micro-mechanical component wherein the risk of rupturing or deforming the micro-mechanical component or a part thereof is minimised. The invention also relates to a semiconductor wafer having a micro-mechanical component formed therein.

BACKGROUND TO THE INVENTION

Semiconductor wafers comprising micro-mechanical components, for example, micro-mirrors, are known. The micro-mechanical components are formed in a membrane layer, and where the micro-mechanical components are micro-mirrors, the micro-mirrors are of thickness similar to the depth of the membrane layer. In order to minimise the mass of the micro-mirrors, and in turn, the drive voltage required for tilting the micro-mirrors, the micro-mirrors should be relatively thin, and typically, of thickness in the range of 3 µm to 10 µm, and preferably, closer to 3 µm for minimising the drive voltage required to tilt the micro-mirrors. Thus, the membrane layer in which the micro-mirrors are to be formed should be of depth similar to the desired thickness of the micro-mirrors, and thus, in the range of 3 µm to 10 µm, and preferably, in the order of 3 µm.

The membrane layer is supported on a handle layer, and in general, a buried insulating layer is disposed between the handle layer and the membrane layer. Generally, both the handle layer and the membrane layer are of silicon, and the buried insulating layer is an oxide layer. The oxide layer may be formed on either the handle layer or the membrane layer and laminated to the other of the handle layer and the membrane layer by a suitable bonding process. The buried oxide layer may be either grown, or may be deposited by, for example, chemical vapour deposition. After the membrane layer and the handle layer have been laminated together with the buried oxide layer disposed between the respective layers, the membrane layer is machined to the desired depth, which as mentioned above is typically in the range of 3 µm to 10 µm. The handle layer typically is of depth in the range of 300 µm to 400 µm while the buried oxide layer is of depth typically less than 500 nm.

After lamination and machining of the membrane layer and the handle layer, a photo-resist layer is deposited on the exposed surface of the membrane layer, which is patterned to define the micro-mechanical components. The membrane layer is etched to form a plurality of trenches which extend through the membrane layer to the buried oxide layer for defining the micro-mechanical components. Where the micro-mechanical components are micro-mirrors, two arcuate trenches are typically formed to define each micro-mirror. The two trenches together define the micro-mirror and a pair of tethers. The tethers extend between the membrane layer and the micro-mirror on respective opposite sides of the micro-mirror for supporting the micro-mirror in the membrane layer. The tethers of each micro-mirror define a pivot axis about which the micro-mirror is tiltable. After the membrane layer has been etched to form the micro-mirrors, the handle layer is then etched to form communicating openings to the respective micro-mirrors. The communicating openings are typically formed by through bores which extend through the handle layer and the buried oxide layer. Typically, the through bores are of cross-sectional area greater than the area of the micro-mirrors, and typically, each through bore is of cross-sectional area similar to the area of the micro-mirror plus the width of the trenches on opposite sides of the micro-mirror. At an appropriate time one or both faces of the micro-mirrors are metallised for providing a reflective surface or surfaces on each micro-mirror.

The actual etching of the trenches in the membrane layer to the buried oxide layer for defining the micro-mirrors and their tethers is a relatively straightforward procedure. However, once the trenches have been formed in the membrane layer, the portions of the buried oxide layer bridging the trenches are unsupported on the membrane layer side of the buried oxide layer. Additionally, during etching of the through bores through the handle layer, the buried-oxide layer acts as an etch stop layer. Some of the through bores etch faster than others, due to variation of the etch rate across the semiconductor wafer, and thus, the portions of the buried oxide layer at the end of some of the through bores will be exposed to the through bore etch longer than others. The through bore etch has an etching effect on the portions of the buried oxide layer exposed by the through bores, and those portions of the buried oxide layer which are subjected to the through bore etch for a relatively lengthy duration are etched to a relatively thin depth. Additionally, the through bore etch induces stresses in the portions of the buried oxide layer which are exposed by the through bores, and which have been subjected to the through bore etch for relatively lengthy durations.

It has been found that the magnitude of the stresses increases as a function of the duration for which the portions of the buried oxide layer are subjected to the through bore etch and the amount by which the buried oxide layer has been thinned. It has been found that when the buried oxide layer has been thinned to a thickness of less than 200 nm, it is no longer able to withstand the induced stresses, and the unsupported portions of the buried oxide layer commence to curl up at the periphery of the through bores, and thus rupture from the buried oxide layer which is buried between the membrane and handle layers. In other words, the portions of the buried oxide layer adjacent the peripheral edge of some of the through bores which are unsupported by virtue of the arcuate trenches having been formed in the membrane layer curl up into the through bore, thus rupturing from the remainder of the buried oxide layer. Since the tethers which are supporting the micro-mirrors are of relatively small transverse cross-section and are attached to the buried oxide layer, the curling up of the peripheral edges of the portions of the buried oxide layer can cause one or both of the tethers to curl up with the buried oxide layer. This, thus, causes the tether or tethers to rupture from the membrane layer, thus leaving the micro-mirror partly or wholly unsupported in the membrane layer.

Even if the buried oxide layer does not curl up adjacent the periphery of the through bore, thus leaving the tethers intact, it has been found that the stresses induced in the portions of the buried oxide layer at the end of the through bores, which have been exposed to the through bore etch for a relatively lengthy duration, cause the oxide layer to bow.

Since the micro-mirrors are relatively thin, in the range of 3 µm to 10 µm and are attached to the buried oxide layer, the bowing of the oxide layer causes similar bowing in the micro-mirrors. Such bowing leaves the micro-mirrors unsuitable for use.

The problem of rupturing of the tethers is particularly common in semiconductor wafers where the depth of the membrane layer is at the lower end of the range of 3 µm to 10 µm, and in turn the micro-mirrors or other micro-mechanical components which are of similarly small thickness. Increasing the thickness of the buried oxide layer, while it may overcome the problem of rupturing of the unsupported bridging portions of the oxide layer, results in another problem. It has been found that the stresses induced in portions of thicker buried oxide layers at the end of the through bores which have been exposed to the through bore etch for relatively lengthy durations are such as to cause bowing of the buried oxide layer at the end of the through bore. Since the micro-mirrors or other micro-mechanical components are attached to the buried oxide layer, bowing of the buried oxide layer causes bowing of the micro-mirrors or other micro-mechanical components, which in many cases leads to rupturing of the component, and where the component is a micro-mirror, the micro-mirror may rupture or one or both of its tethers may rupture.

The problem of bowing of micro-mirrors resulting from bowing of the buried oxide layer also increases as the depth of the membrane layer, and thus the thickness of the micro-mirror or micro-mechanical component is reduced, and the thickness of the buried oxide layer is increased, since the thinner the micro-mirror or micro-mechanical component is, the more susceptible it is to bowing, resulting from bowing of the buried oxide layer.

There is therefore a, need for a method for forming a micro-mirror and for forming other micro-mechanical components in a semiconductor wafer wherein the risk of rupturing or deforming of the micro-mechanical component or a part thereof is minimised.

The present invention is directed towards providing such a method, and the invention is also directed towards providing a semiconductor wafer comprising a micro-mechanical component formed therein.

SUMMARY OF THE INVENTION

According to the invention there is provided a method for forming a micro-mechanical component in a semiconductor wafer comprising a membrane layer supported on a handle layer with a buried insulating layer disposed between the membrane layer and the handle layer, the micro-mechanical component being formed in the membrane layer, and a communicating opening extending through the handle layer and the buried insulating layer exposing the micro-mechanical component, the method comprising the steps of:
forming at least one trench extending through the membrane layer for defining the micro-mechanical component therein, each trench exposing a portion of the buried insulating layer bridging the trench,
applying a support layer to each bridging portion of the buried insulating layer, the support layer extending across each trench, and being applied to each bridging portion of the buried insulating layer prior to the bridging portion being exposed by the communicating opening through the handle layer for supporting the bridging portion for preventing rupturing of the buried insulating layer when the buried insulating layer is exposed by the communicating opening through the handle layer.

In one embodiment of the invention the support layer is applied to each bridging portion of the buried insulating layer by back filling the corresponding trench formed in the membrane layer with material for forming the support layer.

Preferably, the support layer is applied to the surface of the micro-mechanical component in a plane parallel to the plane of the exposed surface of the membrane layer for preventing bowing of the micro-mechanical component when the communicating opening has been formed in the handle layer, and prior to the buried insulating layer adjacent the micro-mechanical component exposed by the communicating opening being removed. Advantageously, the support layer is applied to the entire exposed surface of the micro-mechanical component.

In one embodiment of the invention the support layer is applied to the exposed surface of the membrane layer adjacent the micro-mechanical component. Preferably, the support layer is applied to the entire exposed surface of the membrane layer.

In one embodiment of the invention the support layer is deposited.

In another embodiment of the invention the support layer is an oxide layer. Advantageously, the depth of the oxide support layer is in the range of 0.4 µm to 2 µm. Ideally, the depth of the oxide support layer is in the order of 1 µm.

Alternatively, the support layer is of photo-resist material, and preferably, when the support layer is of a photo-resist material, the depth of the support layer is in the range of 1 µm to 10 µm, and preferably, is in the order of 5 µm.

In another alternative embodiment of the invention the support layer comprises a first support layer, and a second support layer applied over the first support layer. Preferably, the first support layer is an oxide layer, and preferably, the oxide of the first support layer is deposited. Preferably, the first support layer is of depth in the range of 0.4 µm to 1.5 µm, and advantageously, the first support layer is of depth in the order of 1 µm.

In another embodiment of the invention the second support layer is a silicon based layer, and preferably, the second support layer is a deposited layer, and advantageously, the second support layer is a polysilicon layer.

In one embodiment of the invention the second support layer of polysilicon is of depth in the range of 1 µm to 10 µm, and preferably, the second support layer of polysilicon is of depth in the order of 4 µm.

In one embodiment of the invention the second support layer comprises a silicon wafer bonded to the first support layer, and where the second support layer comprises a silicon wafer bonded to the first support layer, the second support layer while it is acting as a support layer is of depth in the range of 5 µm to 100 µm, and preferably, the second support layer while it is acting as a support layer is of depth in the order of 20 µm.

In one embodiment of the invention an access opening is etched through the second support layer for providing access to the micro-mechanical component through the second support layer, and the portion of the first support layer adjacent the micro-mechanical component is removed through the access opening.

In another embodiment of the invention the portion of the buried insulating layer exposed by the communicating opening and the support layer are removed when the communicating opening has been formed in the handle layer.

Preferably, the portion of the buried insulating layer exposed by the communicating opening is removed before the support layer is removed.

Advantageously, the support layer and the portion of the buried insulating layer exposed by the communicating opening are simultaneously removed.

In one embodiment of the invention the micro-mechanical component is a micro-mirror supported in the membrane layer by a pair of tethers located on opposite sides of the micro-mirror for defining a pivot access about which the micro-mirror is tiltable.

In one embodiment of the invention the depth of the membrane layer is in the range of 2 μm to 30 μm.

In another embodiment of the invention the depth of the membrane layer is in the order of 3 μm.

In a further embodiment of the invention the buried insulating layer is of depth in the range of 0.2 μm to 1 μm.

In a still further embodiment of the invention the buried insulating layer is in the order of 0.4 μm.

The invention also provides a semiconductor wafer comprising:
 a handle layer,
 a membrane layer supported on the handle layer,
 a buried insulating layer disposed between the membrane layer and the handle layer, and
 a micro-mechanical component formed in the membrane layer and supported therein, the semiconductor wafer being formed according to the method of the invention.

In one embodiment of the invention a communicating opening extends through the handle layer to the micro-mechanical component.

Further the invention provides a semiconductor wafer comprising:
 a handle layer,
 a membrane layer supported on the handle layer,
 a buried insulating layer disposed between the membrane layer and the handle layer,
 a micro-mechanical component formed in the membrane layer by at least one trench extending through the membrane layer, and supported therein, and
 a communicating opening extending through the handle layer and the buried insulating layer to the micro-mechanical component, wherein
 prior to forming the communicating opening a support layer is applied to each bridging portion of the buried insulating layer, the support layer extending across each trench, and being applied to each bridging portion of the buried insulating layer prior to the bridging portion being exposed by the communicating opening through the handle layer for supporting the bridging portion for preventing rupturing of the buried insulating layer when the buried insulating layer is exposed by the communicating opening through the handle layer, the support layer being removed subsequently.

ADVANTAGES OF THE INVENTION

The advantages of the invention are many. The method according to the invention minimises the rupturing of micro-mechanical components from the membrane layer, and in general, eliminates rupturing of micro-mechanical components from the membrane layer. Additionally, the method according to the invention minimises bowing of micro-mechanical components, and in general, eliminates bowing of micro-mechanical components. This is particularly advantageous when the micro-mechanical components are micro-mirrors. By virtue of the fact that the bridging portions of the buried insulating layer which bridge the trenches in the membrane layer are supported by the support layer prior to exposing the portion of the buried insulating layer by the communicating opening through the handle layer, the induced stresses in the portion of the buried insulating layer which are induced during etching of the communicating opening through the handle layer are counteracted by the support layer, thereby preventing rupturing of the micro-mechanical component, and in particular, preventing rupturing of the micro-mechanical component from the membrane layer. In other words, stresses induced in the portion of the buried insulating layer exposed by the communicating opening through the handle layer, which would otherwise cause the bridging portions of the buried insulating layer to rupture are counteracted by the supporting action of the support layer on the bridging portions of the buried insulating layer. Thus, once rupturing of the bridging portions of the buried insulating layer is avoided, rupturing of the micro-mechanical component, and in particular, rupturing of the micro-mechanical component from the membrane layer is similarly avoided.

Additionally, the provision of the support layer on the exposed surfaces of the micro-mechanical component also acts to counteract the stresses induced in the portion of the buried insulating layer exposed by the communicating opening through the handle layer, thereby preventing bowing of the exposed portion of the buried insulating layer. Once bowing of the portion of the buried insulating layer exposed by the communicating opening through the handle layer adjacent the micro-mechanical component is avoided, bowing of the micro-mechanical component is similarly avoided. Indeed, a particularly important advantage is achieved by the method according to the invention when the micro-mechanical component is a micro-mirror. By preventing rupturing of the bridging portions of the buried insulating layer, rupturing of the tethers supporting the micro-mirror in the membrane layer is avoided. Similarly, by preventing bowing of the portion of the buried insulating layer exposed by the communicating opening through the handle layer which is adjacent the micro-mirror, bowing of the micro-mirror is likewise avoided.

By virtue of the fact that rupturing and deforming of the micro-mechanical component are avoided, micro-mechanical components of smaller depth than heretofore can be fabricated, and accordingly, membrane layers in which the micro-mechanical components are to be formed can be of smaller depth than heretofore. Additionally, the provision of the support layer supporting the micro-mechanical component, and in particular supporting the bridging portions of the buried insulating layer, allows buried insulating layer of significantly greater ranges of depths to be used; both greater and lesser depths than have been possible heretofore.

As discussed above, it has been found that, in general, buried insulating layers of less than 200 nm are unable to withstand stresses induced by the etching, and in particular over etching through the communicating openings, and rupturing of unsupported portions of the buried insulating layer takes place. Accordingly, in order to minimise rupturing and also bowing of the unsupported portions of the buried insulating layer, it has been necessary to provide such buried insulating layers to be of depth greater than 400 nm. However, as discussed above, over etching of the communicating openings also induces stresses in the buried insulating layers of 400 nm and greater, which because of their depth relative to the depth of the membrane layer lead to bowing of the buried insulating layer, and in turn the micro-mechanical components. By supporting the buried insulating layer with the support layer where it bridges the trenches in accordance with the invention, buried insulating layers of lesser depth than have been possible heretofore can be used, as can buried insulating layers of greater depth than have been possible heretofore, can also be used. It has been found that by supporting the bridging portions of the buried insulating layer with the support layer according to the invention the depth of the buried insulating layer can be reduced to depths of the order of 200 nm without rupturing of the bridging portions occurring. Furthermore, buried insulating layers of depth greater, and significantly greater than 400 nm can be used when the exposed surface of the membrane layer, and in particular the exposed surface of the micro-mechanical component is supported by the support layer, since any tendency of the buried insulating layer to bow, and induce bowing stresses in the micro-mechanical component is counteracted by the support layer.

The invention and its advantages will be more clearly understood from the following description of some preferred embodiments thereof, which are given by way of example only, with reference to the accompanying drawings, in which:

DETAILED DESCRIPTION OF THE INVENTION

Referring to the drawings and initially to FIGS. 1 to 6, there is illustrated a portion of a semiconductor wafer according to the invention indicated generally by the reference numeral 1 which is formed by a method also according to the invention. The drawings are not to scale and are provided solely for illustrating the principle of the invention. The semiconductor wafer 1 comprises a membrane layer 2 supported on a handle layer 3, and a micro-mechanical component, namely, a micro-mirror 5 formed in the membrane layer 2. The membrane and handle layers 2 and 3, respectively are both of single crystal silicon. A buried insulating layer which in this embodiment of the invention is a buried oxide layer 6 is located between the membrane layer 2 and the handle layer 3 for insulating the membrane and handle layers 2 and 3, respectively, from each other. The buried oxide layer 6 may be grown or deposited on either the membrane layer 2 or the handle layer 3. However, in this embodiment of the invention the buried oxide layer 6 is thermally grown on the handle layer 3 and is laminated to the membrane layer 2 by any suitable bonding process. Such bonding processes will be well known to those skilled in the art. An example of a suitable bonding process is direct wafer fusion bonding.

Figure 1:
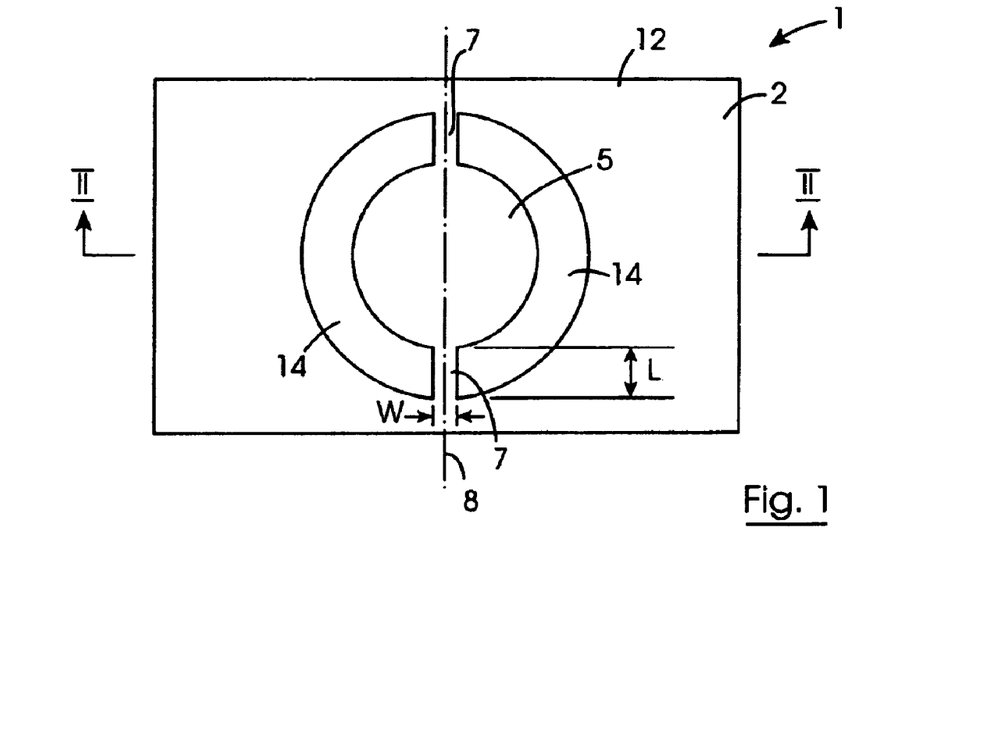
FIG. 1 is a top plan view of a portion of a semiconductor wafer according to the invention.

Although the semiconductor wafer 1 is illustrated as comprising only one micro-mirror 5, the semiconductor wafer 1 comprises a plurality of micro-mirrors 5 arranged in a matrix array of rows and columns of micro-mirrors. The semiconductor wafer 1 may comprise any desired number of micro-mirrors 5, typically, arrays of micro-mirrors in which the arrays contain from as little as four micro-mirrors to two hundred and fifty-six micro-mirrors may be provided, although it will be readily apparent to those skilled in the art that larger arrays of micro-mirrors may be provided. The micro-mirrors 5 of an array typically are similar to each other, although they may be different. For convenience and for ease of description, only one of the micro-mirrors 5 is illustrated and described. It will be appreciated that the other micro-mirrors will be simultaneously formed with the micro-mirror 5.

Each micro-mirror 5 is of circular shape, and is tiltably connected to the membrane layer 2 by two tethers 7 which extend radially from respective opposite side edges of the micro-mirror 5 at 180° intervals around the micro-mirror 5 to the membrane layer 2. The tethers 7 pivotally connect the micro-mirrors 5 to the membrane layer 2, and define a pivot axis 8 about which the micro-mirror 5 is tiltable. In this embodiment of the invention the micro-mirrors 5 are of 500 μm diameter at spacings centre to centre of 800 μm. The tethers 7 are of length L of approximately 100 μm, and are of relatively small transverse cross-sectional area and are of width w of 2 μm and of depth d similar to the thickness of the membrane layer 2.

Figure 2:
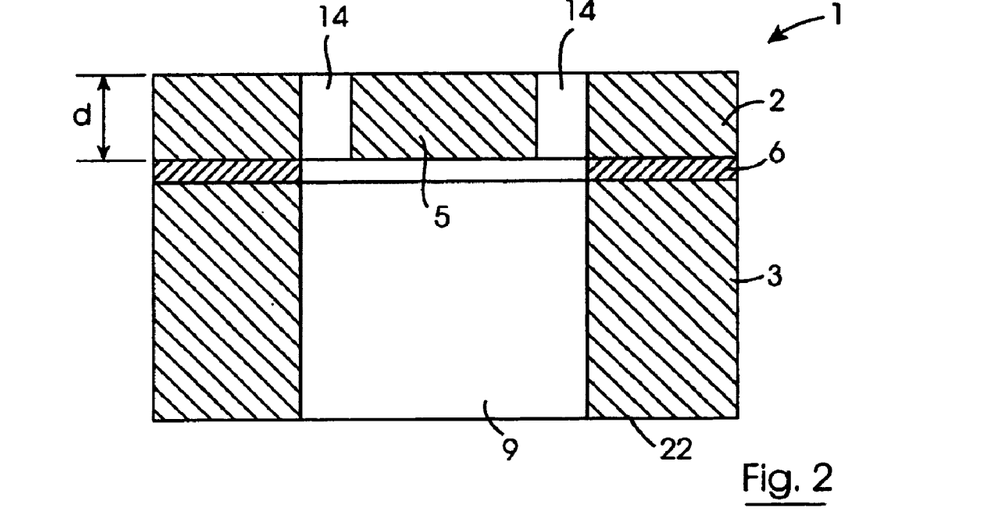
FIG. 2 is a transverse cross-sectional side elevational view of the portion of the semiconductor wafer of FIG. 1 on the line II—II of FIG. 1.

In this embodiment of the invention the handle layer 3 is of depth of approximately 350 μm, while the membrane layer 2 is of depth of approximately 3 μm, and thus, the depth d of the tethers 7 and the depth or thickness of the micro-mirrors 5 is similarly 3 μm, approximately. The buried oxide layer 6 is of depth of approximately 400 nm.

A plurality of communicating openings provided by through bores 9, only one of which is illustrated, extend through the handle layer 3 and the oxide layer 6, one through bore 9 being provided to each micro-mirror 5 for providing access to the micro-mirror 5 and for facilitating tilting of the micro-mirror 5. The through bores 9 are of circular transverse cross-section, and are of diameter equal to the diameter of the corresponding micro-mirror 5 plus the lengths of the two tethers 7. Electrodes (not shown) located on another silicon layer (also not shown) are provided adjacent the through bores 9 for selectively tilting each micro-mirror 5, in response to an electrical signal on the corresponding electrode or electrodes, depending on the number of electrodes provided for each micro-mirror 5. The arrangement of such electrodes will be well known to those skilled in the art.

One or both surfaces of the micro-mirrors 5 may be metallised, depending on whether one or both surfaces of the micro-mirrors 5 are to be reflective.

In the fabrication of the semiconductor wafer 1 by the method according to the invention, the lamination of the membrane layer 2 and the handle layer 3 with the buried oxide layer 6 is carried out in a conventional manner as will be well known to those skilled in the art. Typically, the handle layer 3 will be machined from a wafer of single crystal silicon, and will initially be of depth greater than 350 μm, and the membrane layer 2 will be machined from a wafer of single crystal silicon, and will be initially of depth significantly greater than 3 μm, and may be of depth similar to that of the wafer from which the handle layer is formed. The oxide layer 6 is thermally grown on the handle layer 3 to a depth of approximately 400 nm, and the membrane layer 2 is laminated to the oxide layer 6. After lamination, the membrane layer 2 and handle layer 3 are machined to the desired depths, in this case 3 μm for the membrane layer 2 and 350 μm for the handle layer 3. Although, if desired and appropriate, machining of the handle layer 3 may be deferred to a later stage of the processing of the semiconductor wafer 1.

Figure 3:
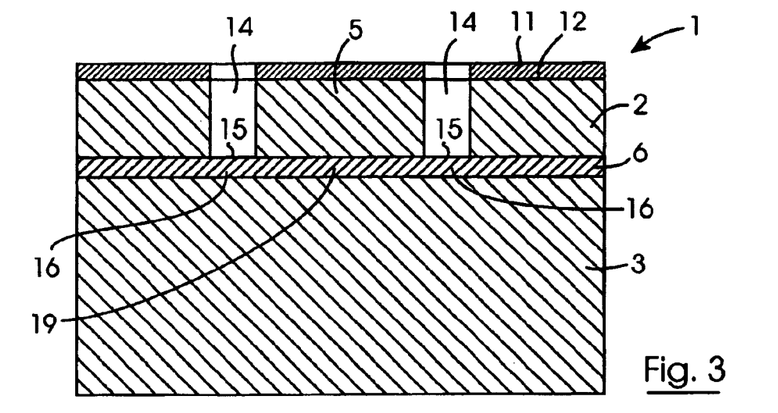
FIG. 3 is a view similar to FIG. 2 of the semiconductor wafer of FIG. 1 at one stage in its formation.
Figure 4:
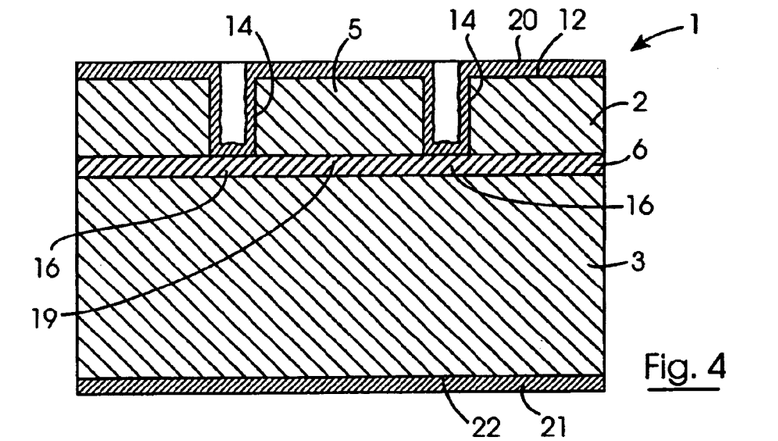
FIG. 4 is a view similar to FIG. 2 of the semiconductor wafer of FIG. 1 at another stage in its formation.

A photo-resist layer 11 is then deposited on the exposed surface 12 of the membrane layer 2, and is patterned to define the micro-mirrors 5, see FIG. 3. The semiconductor wafer 1 is then subjected to a suitable etch for etching trenches 14 into the membrane layer 2 through the patterned photo-resist layer 11 to the buried oxide layer 6 for defining the micro-mirrors 5. The trenches 14 are of arcuate shape, and two trenches 14 define one micro-mirror 5. The buried oxide layer 6 forms an etch stop layer, and on completion of the trench etch, surfaces 15 of bridging portions 16 of the buried oxide layer 6 which bridge the trenches 14 are exposed through the trenches 14. Each pair of trenches 14 as well as defining one of the micro-mirrors 5 also defines the corresponding pair of tethers 7 for pivotally connecting the micro-mirror 5 to the membrane layer 2 and for defining the pivot axis 8 about which the micro-mirror 5 is tiltable. The photo-resist layer 11 is removed on completion of the etching of the trenches 14 to the buried oxide layer 6.

In order to compensate for stresses which will subsequently be induced in portions 19 of the buried oxide layer 6 adjacent the micro-mirrors 5 during etching of the through bores 9, and to prevent rupturing of the bridging portions 16 of the buried oxide layer 6, when the bridging portions 16 of the buried oxide layer 6 are unsupported by the handle layer 3, a support layer 20 in accordance with the invention is provided for supporting the buried oxide layer 6, the micro-mirrors 5 and their tethers 7. The portions 19 of the buried oxide layer 6 in which stresses are induced during etching of the through bores 9 are those portions of the buried oxide layer 6, which are exposed by the through bores 9. The support layer 20 is an oxide layer, and is deposited on the exposed surface 12 of the membrane layer 2, and is back filled into the trenches 14 prior to etching of the through bores 9, see FIG. 4. The oxide support layer 20 in this embodiment of the invention is deposited by chemical vapour deposition over the entire surface 12 of the membrane layer 2, including the micro-mirrors 5 and the tethers 7, and is back filled into the trenches 14. The oxide of the support layer 20 is deposited to a depth of approximately 1 μm, over the exposed surface 12 of the membrane layer 2, which results in the trenches 14 being back filled to a depth of approximately 900 nm. Thus, the depth of the support layer 20 supporting the bridging portions 16 of the buried oxide layer 6 is approximately 900 nm. Accordingly, in this embodiment of the invention the support layer 20 is deposited to a depth of approximately twice the depth of the buried oxide layer. It has been found that this is sufficient for supporting the bridging portions 16 of the buried oxide layer 6 against the stresses induced in the portions 19 thereof, and thereby prevents rupturing of the bridging portions 16 of the buried oxide layer 6. Additionally, by preventing rupturing of the buried oxide layer 6, consequential rupturing of the tethers 7 is likewise prevented. Depositing the support layer 20 to a depth of approximately twice the depth of the buried oxide layer over the micro-mirrors has also been found sufficient to compensate for the stresses induced in the portions 19 of the buried oxide layer 6, thereby preventing bowing of the portions 19 of the buried oxide layer, and in turn preventing bowing of the micro-mirrors 5.

Figure 5:
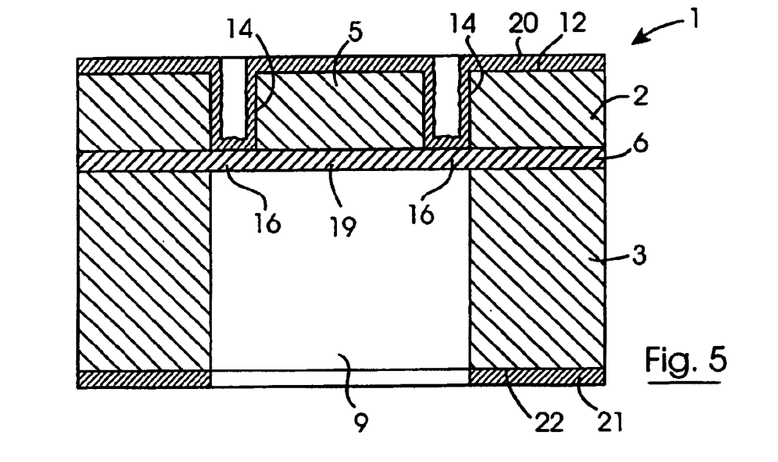
FIG. 5 is a view similar to FIG. 2 of the semiconductor wafer of FIG. 1 at a further stage in its formation.

After the support layer 20 has been deposited over the exposed surface 12 of the membrane layer 2, and has been adequately back filled into the trenches 14 to the appropriate depth, a photo-resist layer 21 is then deposited on the exposed surface 22 of the handle layer 3, and is patterned to define the through bores 9. The through bores 9 are then etched down to the buried oxide layer 6. The buried oxide layer 6 acts as an etch stop layer. However, since the etch rate of the through bores 9 typically varies over the area of the semiconductor wafer 1, some of the portions 19 of the buried oxide layer 6 exposed by the through bores 9 are subjected to the through bore etch for longer periods than other exposed portions 19 of the buried oxide layer 6. The through bore etch commences to etch the exposed portions 19 of the buried oxide layer 6 and induces stresses in the exposed portions 19. The longer the exposed portions 19 of the buried oxide layer 6 are subjected to the through bore etch, the thinner the exposed portions 19 become, and also the greater the induced stresses will become. It is these stresses, which if the bridging portions 16, the tethers 7 and the micro-mirrors 5 were not supported by the support layer 20, would cause the bridging portions 16 to curl up into the through bores 9, and thus rupture from the remainder of the buried oxide layer 6. This rupturing of the bridging portions 16 of the buried oxide layer 6 would in turn cause the tethers 7 to rupture with the bridging portions 16, since the bridging portions 16 are laminated to the tethers 7. However, the provision of the support layer 20 supporting the bridging portions 16 and the tethers 7 prevent such rupturing. Additionally, the stresses induced in the exposed portions 19 by the through bore etch, in the absence of the support layer 20 on the exposed surface of the micro-mirrors 5 would cause the exposed portions 19 of the buried oxide layer 6 to bow into a dish shape. Since the exposed portions 19 are laminated to the micro-mirrors 5, the bowing of the exposed portions 19 would in turn induce stresses in the micro-mirrors 5, which would cause the micro-mirrors 5 to bow into corresponding dish shapes along with the exposed portions 19. However, the provision of the support layer 20 over the micro-mirrors 5 supports the micro-mirrors 5 to a sufficient extent to counteract the stresses induced in the exposed portions 19 of the buried oxide layer 6, thus preventing bowing of the exposed portions 19 of the buried oxide layer 6 and the micro-mirrors 5.

Figure 6:
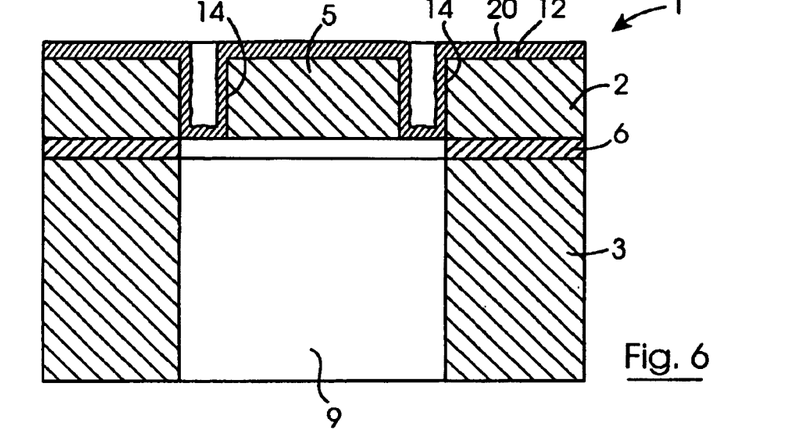
FIG. 6 is a view similar to FIG. 2 of the semiconductor wafer of FIG. 1 at a still further stage in its formation.

Once the etching of the through bores 9 has been completed, the entire exposed portions 19 of the buried oxide layer 6 which are exposed by the through bores 9 including the bridging portions 16 are removed by a suitable etch, typically a wet etch, and on removal of the exposed portions 19 of the buried oxide layer 6, the entire support layer 20 is removed by a suitable etch, typically, a wet etch also. If the handle layer 3 at this stage has not been machined to the desired depth of 350 μm, the handle layer 3 can be machined at this stage to the appropriate depth. Thereafter the semiconductor wafer is subjected to other appropriate processing steps as desired, and metallisation of one or both faces of the micro-mirrors 5 may be carried out at any suitable time during further processing of the semiconductor wafer 1.

By virtue of the fact that the bridging portions 16 of the buried oxide layer 6 bridging the trenches 14 are supported by the support layer 20, while the exposed portions 19 of the buried oxide layer 6 are exposed by the through bores 9, and also by virtue of the fact that the support layer 20 supports the micro-mirrors 5 and the tethers 7, while the portions 19 of the buried oxide layer 6 are exposed by the through bores 9, any danger of the buried oxide layer 6 and the tethers 7 rupturing or the micro-mirrors 5 bowing as a result of stresses induced in the exposed portions 19 of the buried oxide layer 6 is avoided. This is because the support layer 20 supports the micro-mirrors 5, the tethers 7 and the bridging portions 16 of the buried oxide layer 6, thereby compensating for the stresses induced in the exposed portions 19 of the buried oxide layer 6.

It has been found that with a buried oxide layer 6 of depth 400 nm between the handle layer 3 and the membrane layer 2, a support layer formed by a deposited oxide support layer of 900 nm to 1,000 nm is adequate for supporting the bridging portions 16 of the buried oxide layer 6 as well as the tethers 7. It has also been found that this depth of an oxide support layer 20 is sufficient for preventing bowing of the micro-mirrors 5. In general, it is believed that where the support layer is provided as a chemically deposited oxide layer, the oxide layer should be deposited to a depth in the range of 0.5 to 2 times the, depth of the buried oxide layer 6 between the handle layer 3 and the membrane layer 2. Typically, an oxide support layer 20 in the range of 0.4 µm to 2 µm is suitable for buried oxide layers up to 1 µm.

It has been demonstrated that with the above described array of 256 micro-mirrors of 500 µm diameter and located at 800 µm apart centre to centre with a handle layer 3, a membrane layer 2, a buried oxide layer 6 and a support layer 20 of the type and dimensions described above bowing of the micro-mirrors was avoided, and none of the tethers 7 ruptured, nor was there any sign of rupturing of the portions of the buried oxide layer 6 exposed by the trenches 14.

Figure 7:
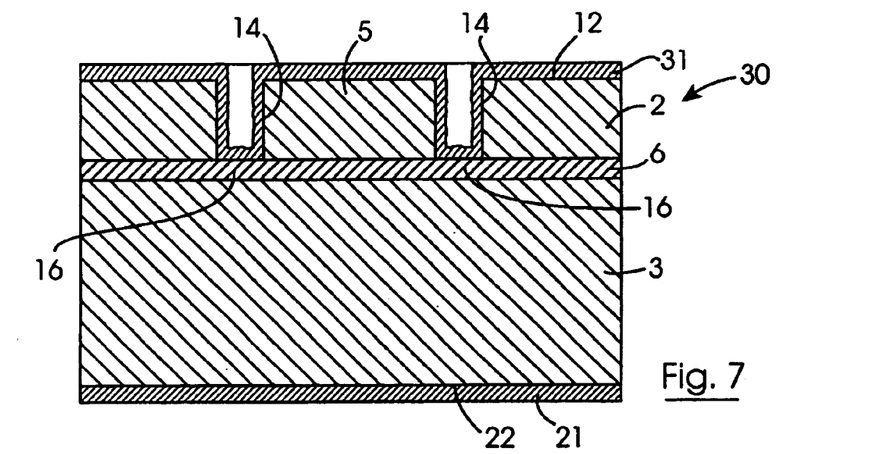
FIG. 7 is a view similar to FIG. 2 of a portion of a semiconductor wafer according to another embodiment of the invention, at a stage in its formation similar to that of FIG. 4.

Referring now to FIG. 7, there is illustrated a semiconductor wafer indicated generally by the reference numeral 30 also according to the invention in the process of being fabricated by a method according to another embodiment of the invention. The semiconductor wafer 30 is substantially similar to the semiconductor wafer 1 described with reference to FIGS. 1 to 6, and similar components are identified by the same reference numerals. The semiconductor wafer 30 when completed comprises an array of micro-mirrors 5 similar to those described with reference to the semiconductor wafer 1 formed in the membrane layer 2, which is supported on a handle layer 3 with a buried oxide layer 6 located between the membrane layer 2 and the handle layer 3. For convenience only one micro-mirror 5 is illustrated. Through bores (not shown) similar to the through bores 9 of the semiconductor wafer 1 are formed in the handle layer 3 for providing access to the respective micro-mirrors 5. Bridging portions 16 of the buried oxide layer 6, tethers (not shown) and the micro-mirrors 5 are supported by a support layer 31 prior to etching of the through bores 9, in similar fashion as the bridging portions 16 of the buried oxide layer 6, the tethers 7 and the micro-mirrors 5 of the semiconductor wafer 1 are likewise supported. However, in this embodiment of the invention the support layer 31 is formed by depositing a photo-resist layer over the exposed surface 12 of the membrane layer 2, and the photo-resist material is back filled into the trenches 14 for forming the support layer 31 over the membrane layer 2, the micro-mirrors 5, the tethers 7 and the bridging portions 16 of the buried oxide layer 6.

The buried oxide layer 6 is grown to a depth of 500 nm on the handle layer 3 and the membrane layer 2 is laminated to the buried oxide layer 6, as already described with reference to the semiconductor wafer of FIGS. 1 to 6. The membrane layer 2 is then machined to a depth of approximately 10 µm, and the handle layer 3 is machined to a depth of approximately 400 µm. The trenches 14 for defining the micro-mirrors 5 and the tethers 7 are formed by etching in similar fashion as described with reference to the semiconductor wafer 1. After the trenches 14 have been formed, the photo-resist material is then deposited over the exposed surface 12 of the membrane layer 2, the micro-mirrors 5, the tethers 7 and the bridging portions 16 of the buried oxide layer for forming the support layer 31. In this embodiment of the invention the support layer 31 is deposited to a depth of approximately 7 µm on the exposed surface 12 of the membrane layer 2, and back filling of the photo-resist material into the trenches 14 causes the support layer 31 supporting the bridging portions 16 to be of depth of between 5 µm to 10 µm.

Additionally, during the deposition of the photo-resist material of the support layer 31 the semiconductor wafer 30 is supported so that a photo-resist layer 21 is simultaneously deposited on the exposed surface 22 of the handle layer 3. After the photo-resist layer 21 has been deposited, the photo-resist layer 21 is patterned to define the through bores 9, and the through bores 9 are etched through the handle layer 3 to the buried oxide layer 6. The exposed portions 19 of the buried oxide layer 6 exposed by the through bores 9 are then etched by a suitable etchant, and the support layer 31 of photo-resist material and the photo-resist layer 21 are subsequently simultaneously removed by-any suitable process. Otherwise fabrication of the semiconductor wafer 30 is similar to that of the semiconductor wafer 1.

In this embodiment of the invention the semiconductor wafer 30 comprises an eight by eight array of micro-mirrors 5. The micro-mirrors 5 are of 2 mm diameter at spacings centre to centre of 2.5 mm. A global wafer loading across the wafer of 30% was achieved, while a local loading of 50% was achieved. Global wafer loading is the percentage of the exposed silicon to be etched across the complete wafer. Local loading is the percentage of the exposed silicon in the actual device.

It has been found that with a buried oxide layer of 500 nm between the handle layer 3 and the membrane layer 2, a support layer formed of photo-resist material and deposited to a depth of 7 µm is adequate for supporting the bridging portions 16 of the oxide layer 6 as well as the tethers 7. In general, it is believed that where the support layer is provided as a deposited photo-resist layer, the support layer should be of depth in the range of 2 to 20 times the depth of the buried oxide layer 6 between the handle layer 3 and the membrane layer 2.

An advantage of providing the support layer as a photo-resist support layer is that it allows for prior metallisation of the micro-mirrors, since the deposition of the photo-resist support layer has no adverse effect on the metallisation layer on the micro-mirrors. Additionally, the exposed portions 19 of the buried oxide layer 6 exposed by the through bores 9 are readily easily removed prior to removal of the support layer of photo-resist material which is ashed after the exposed portions 19 of the buried oxide layer 6 have been removed. Additionally, the photo-resist material of the support layer acts as a glue-like layer during the wet oxide etch removal of the exposed portions 19 of the buried oxide layer 6, thereby effectively supporting the exposed portions 19 of the buried oxide layer 6 until the last of the exposed portions have been etched away. The photo-resist support layer is then subsequently stripped by oxygen plasma for ashing thereof.

However, a slight disadvantage of the use of a photo-resist support layer is that in general, it is not possible to reduce the depth of the membrane layer to the same extent as can be achieved when the support layer comprises an oxide layer without the risk of rupturing the tethers of the micro-mirrors, since the inherent strength of a photo-resist support layer is less than the inherent strength of an oxide support layer.

A further advantage of providing the support layer of photo-resist material is that the photo-resist material can be removed by a dry release process; there are no stiction problems with the dry release of photo-resist, while a wet etch is required to remove the oxide support layers already described in order to avoid stiction problems.

Figure 8:
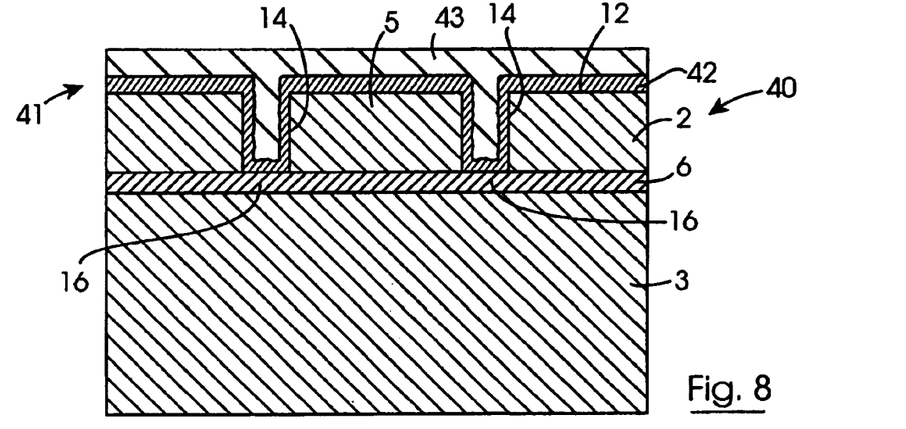
FIG. 8 is a view similar to FIG. 2 of a portion of a semiconductor wafer according to another embodiment of the invention, at a stage in its formation similar to that of FIG. 4.

Referring now to FIG. 8, an alternative method according to the invention for supporting the bridging portions 16 of the buried oxide layer 6, the micro-mirrors 5 and the tethers (not shown) for preventing rupturing of the bridging portions 16, and in turn, the tethers.(not shown), and for preventing bowing of the micro-mirrors 5 will now be described with reference to a partly formed semiconductor wafer 40. The semiconductor wafer 40 is substantially similar to the semiconductor wafer 1 described with reference to FIGS. 1 to 6, and similar components are identified by the same reference numerals. The micro-mirrors 5, only one of which is illustrated, are formed in the membrane layer 2 in similar fashion as the micro-mirrors 5 are formed in the membrane layer 2 of the semiconductor wafer 1.

In this embodiment of the invention the depth of the handle layer 3 is 350 μm, the depth of the membrane layer 2 is 3 μm and the depth of the buried oxide layer 6 is 500 μm. The semiconductor wafer 40 comprises a matrix array of 1,024 micro-mirrors 5 arranged in columns of thirty-two micro-mirrors 5 and rows of thirty-two micro-mirrors 5. The micro-mirrors 5 are of 1,000 μm diameter at spacings centre to centre of 1,300 μm.

After the micro-mirrors 5 have been formed and the photo-resist layer (not shown) has been removed from the exposed surface 12 of the membrane layer 2, and prior to etching of the through bores 9 as described with reference to the semiconductor wafer 1 of FIGS. 1 to 6, a support layer 41 is provided on the exposed surface 12 of the membrane layer 2, including the exposed surfaces of the micro-mirrors 5, the tethers (not shown) and the bridging portions 16 of the buried oxide layer 6 for supporting the bridging portions 16 of the buried oxide layer 6, the micro-mirrors 5 and the tethers (not shown). In this embodiment of the invention the support layer 41 comprises a first support layer 42 of oxide deposited by a TEOS deposition process, and a second support layer 43, which in this case is a silicon based support layer 43, namely, a deposited polysilicon layer.

The first support layer 42 of oxide is deposited over the exposed surface 12 of the membrane layer 2 including the micro-mirrors 5, and the tethers (not shown) and is back filled into the trenches 14, and is deposited to a depth similar to the depth of the buried oxide layer 6, namely, 500 nm, approximately, in order to balance the stresses in the buried oxide layer 6. The second support layer 43 of polysilicon is deposited by a chemical vapour deposition process on top of the first support layer 42 to a depth of 2 μm to 8 μm and completely fills the remainder of the trenches 14.

Once the first and second support layers 42 and 43 have been deposited, the photo-resist layer 21 is deposited on the exposed surface 22 of the handle layer 3, and is patterned as already described with reference to the semiconductor wafer 1 of FIGS. 1 to 6. The through bores (not shown) are etched through the handle layer 3 to the buried oxide layer 6. The first and second support layers 42 and 43 support the bridging portions 16 of the buried oxide layer 6 against rupturing, and also support the tethers (not shown) against rupturing. The first-and second support layers 42 and 43 also support the micro-mirrors 5 to prevent bowing thereof until the exposed portions (not shown) of the buried oxide layer 6 exposed by the through bores (not shown) have been removed. After etching of the exposed portions of the buried oxide layer 6 the second support layer 43 is removed by a plasmaless highly selective XeF2 silicon release process, and the first support layer 42 is then removed by a suitable etch, by either an aqueous or an anhydrous HF technique.

Otherwise the fabrication of the semiconductor wafer 40 is similar to that of the semiconductor wafer 1 described With reference to FIGS. 1 to 6.

It has been found that with a buried oxide layer of depth 500 nm between the handle layer 3 and the membrane layer 2, the provision of the first support layer 42 as a deposited oxide layer to a depth of 500 nm, and the second support layer 43 as a deposition polysilicon layer to a depth of 6 μm is adequate for supporting the bridging portions 16 of the buried oxide layer 6 as well as the tethers (not shown) for preventing rupturing thereof. It has also been found that the provision of the first and second support layers 42 and 43 as just described is sufficient for preventing bowing of the micro-mirrors 5. In general, it is believed that where the first support layer is of oxide deposited by a TEOS deposition process, the first support layer should be deposited to a depth in the range of 0.5 to 2 times the depth of the buried oxide layer 6 between the handle layer 3 and the membrane layer 2. Additionally it is believed that where the second support layer is of polysilicon deposited by chemical vapour deposition, the second support layer should be deposited to a depth in the range of 2 μm to 10 μm, that is provided that a first support layer is an oxide layer deposited to a depth in the range of 0.5 to 2 times the depth of the buried oxide layer 6.

Figure 9:
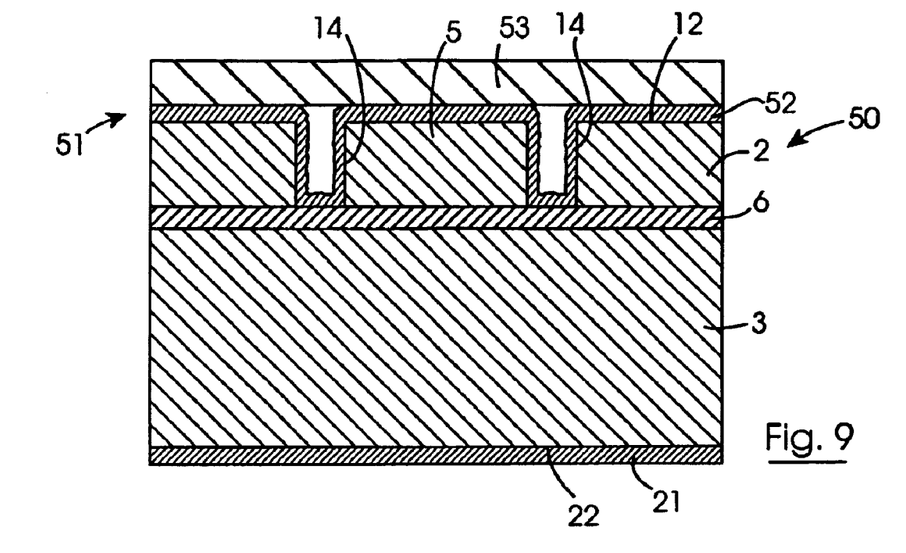
FIG. 9 is a view similar to FIG. 2 of a portion of a semiconductor wafer according to another embodiment of the invention, at a stage in its formation similar to that of FIG. 4.
Figure 10:
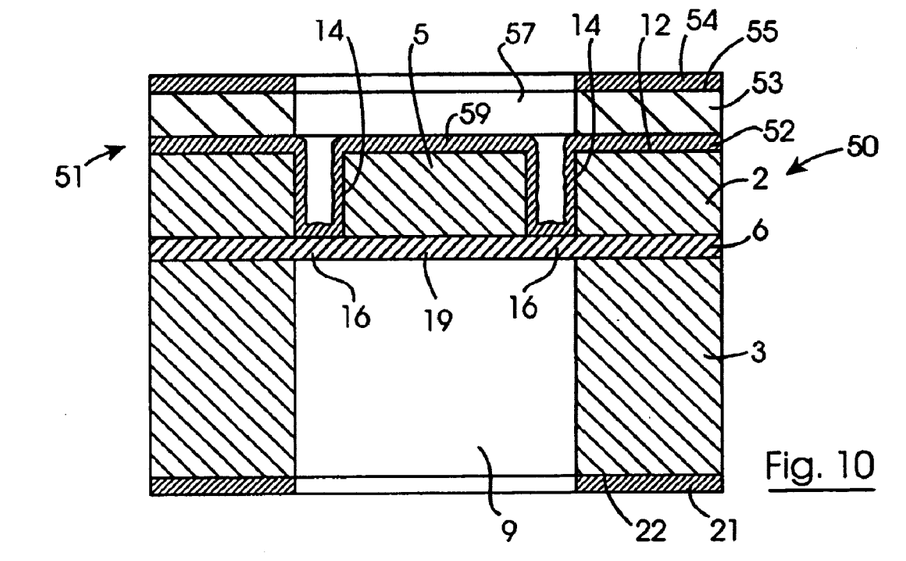
FIG. 10 is a view similar to FIG. 2 of the semiconductor wafer of FIG. 9 at another stage in its formation.

Referring now to FIGS. 9 and 10, there is illustrated a semiconductor wafer according to another embodiment of the invention indicated generally by the reference numeral 50. The semiconductor wafer 50 is substantially similar to the semiconductor wafer 1 described with reference to FIGS. 1 to 6, and similar components are identified by the same reference numerals. The semiconductor wafer 50 comprises a membrane layer 2, which is machined to a depth of 3 μm supported on a handle layer 3 with a buried oxide layer 6 of 1 μm located between the membrane layer 2 and the handle layer 3. The handle layer 3 is approximately 350 μm. A plurality of micro-mirrors 5 are supported in the membrane layer 2 by tethers (not shown) in similar fashion as the micro-mirrors are supported in the membrane layer 2 of the semiconductor wafer 1. For convenience only one micro-mirror 5 is illustrated.

The formation of the trenches 14 for defining the micro-mirrors 5 and the tethers (not shown) of the semiconductor wafer 50 is similar to that already described with reference to the semiconductor wafer 1. When the trenches 14 have been formed and the photo-resist layer removed from the exposed surface 12 of the membrane layer 2, prior to the etching of the through bores 9 a support layer 51 is provided over the exposed surface 12 of the membrane layer 2, the micro-mirrors 5, the tethers (not shown) and the bridging portions 16 of the buried oxide layer 6 for supporting the micro-mirrors 5, the tethers (not shown) and the bridging portions 16.

In this embodiment of the invention the support layer 51 comprises two layers, namely, a first support layer 52 of oxide which subsequently becomes a buried oxide layer and a second support layer 53 comprising a silicon wafer of single crystal silicon. The first support layer 52 of oxide is deposited to a depth of approximately 1 µm by a TEOS deposition process on the membrane layer 2, the micro-mirrors 5 and the tethers (not shown), and is back filled into the trenches 14 to a depth of approximately 1 µm. The silicon wafer of the second support layer 53 which is of a suitable depth for handling, typically 100 µm, is laminated to the first support layer 52 by fusion bonding. After lamination of the silicon wafer of the second support layer 53 to the oxide of the first support layer 52 by a suitable fusion bonding process, the silicon wafer of the second support layer 53 is machined to a depth of approximately 20 µm.

The photo-resist layer 21 is then deposited on the exposed surface 22 of the handle layer 3, and patterned, and the through bores 9 through the handle layer 3 are etched through to the buried oxide layer 6. A photo-resist layer 54 is deposited on an exposed surface 55 of the second support layer 53, and is patterned to define access openings 57 of circular transverse cross-section, which are subsequently etched through the second support layer 53 to the first support layer 52. The photo-resist layer 54 is patterned so that the access openings 57 are aligned with the micro-mirrors 5 and the through bores 9. The access openings 57 are of similar diameter to the diameter of the through bores 9. The through bores 9 and the access openings 57 may be etched in any order, although it is preferable that the through bores 9 should be etched before the access openings 57 are etched. Once the through bores 9 and the access openings 57 have been etched, the exposed portions 19 of the buried oxide layer 6 and portions 59 of the first support layer 52 exposed by the access openings 57 are simultaneously removed by etching through the through bores 9 and the access openings 57 by a suitable etching process, such as an aqueous or an anhydrous HF etch.

As well as exposing the portions 59 of the first support layer 52 adjacent the micro-mirrors 5, the trenches 14 and the tethers (not shown), the access openings 57 also provide direct access to the micro-mirrors 5 when the portions 59 of the first support layer 52 have been removed. Accordingly, in this embodiment of the invention the second support layer 53 forms a part of the semiconductor wafer 50, and the second support layer 53 is insulated from the membrane layer 2 by the remaining portions of the first support layer 52, which becomes a buried oxide layer between the membrane layer 2 and the second support layer 53. The micro-mirrors 5 are accessible through both the access openings 57 in the second support layer 53 and the through bores 9 in the handle layer 3.

Thereafter fabrication of the semiconductor wafer 50 is similar to that described with reference to the semiconductor wafer 1 of FIGS. 1 to 6, with the addition that, if desired, electrically conductive tracks and electronic components may be fabricated in the second support layer 53, and via connections may be made to the membrane layer 2 through the second support layer 53. Additionally, it will of course be appreciated that prior to depositing of the first support layer 52 electrically conductive tracks and electronic components could be fabricated in the membrane layer 2, which could be connected to those components fabricated in the second support layer 53 through via connections therethrough.

The second support layer 53 also acts as a wind break for shielding the respective micro-mirrors 5 from displaced air which is displaced by an adjacent micro-mirror 5 being tilted. Such displaced air could otherwise interfere with the steady state mechanical positioning of adjacent micro-mirrors 5.

If not subsequently required, the second support layer 53 may be removed by etching, for example, by a XeF2 technique.

In this embodiment of the invention the semiconductor wafer 1 comprises a matrix array of 1,600 micro-mirrors 5 arranged in columns of 40 micro-mirrors 5 and rows of 40 micro-mirrors 5. The micro-mirrors 5 are of 2,000 µm diameter at spacings centre to centre of 2,200 µm. Although the silicon wafer of the second support layer has been described as being machined to a depth of 20 µm, it may be machined to a depth in the range of 10 µm to 200 µm. Although it is preferable that while acting as a support layer it is desirable that the depth of the silicon wafer of the second support layer should be of depth not less than 20 µm. The second support layer can be machined to any desired lesser depth once the exposed portions 19 of the buried oxide layer have been removed.

It has been found that with a buried oxide layer of 1 µm between the handle layer 3 and the membrane layer 2, a first support layer of oxide deposited to a depth of 1 µm, with the addition of the second support layer provided by a silicon wafer is adequate for supporting the bridging portions 16 of the oxide layer 6 as well as the tethers 7, for preventing rupturing of the bridging portion 16 and the tethers. It has also been found that this depth of a first support layer of oxide further supported by a second silicon wafer support layer is sufficient for preventing bowing of the micro-mirrors 5. In general, it is believed that where the first oxide support layer is provided as a TEOS deposited oxide layer, the oxide layer should be deposited to a depth in the range of 0.5 to 2 times the depth of the buried oxide layer 6 between the handle layer 3 and the membrane layer 2, and the second silicon wafer support layer should be of depth in the range of 5 µm to 100 µm, and may be of depth up to 200 µm.

The advantages of supporting the bridging portions 16 of the buried oxide layer 6 exposed by the trenches 14 and the micro-mirrors 5 and the tethers 7 according to the method of the invention described with reference to the semiconductor wafer 50 are many. The depths of the respective buried oxide layers, namely, the buried oxide layer 6 and the first oxide support layer 52 can be optimised, and furthermore, can be completely balanced and matched to balance the membrane stresses on respective opposite sides of the micro-mirrors 5. Additionally, the second silicon wafer support layer 53 can be selectively etched to form the access openings 57 to the micro-mirrors 5, and thus create a windbreak between adjacent micro-mirrors of the array of micro-mirrors. Electronic components and electrically conductive tracks can be fabricated on the second silicon wafer support layer and via connections through the silicon support layer to the membrane layer can similarly be fabricated. Further, the membrane layer does not come in contact with any equipment which would be used in the DRIE process, for example, a platen, a chuck or a handler of the DRIE process.

A particularly important advantage of the invention is that by supporting the bridging portions 16 of the buried oxide layer 6, and by supporting the micro-mirrors 5 and the tethers 7 by one or more support layers as already described, it is possible to utilise RIE lag, with narrower features which etch slower than wider features, to etch deep tracks into the handle layer which can be used subsequently for dicing the semiconductor wafer into individual dies.

A further advantage of the invention is that the support layers, be they oxide layers, photo-resist layers, silicon based layers, silicon wafer layers or a combination of some or all of these layers, compensate for the stresses induced in the buried oxide layer 6 during etching of the through bores 9 through the handle layer 3, and thus prevent rupturing or bowing of the micro-mirrors 5. Additionally, the provision of the support layer or layers as oxide layers permits the depth of the buried oxide layer 6 between the handle layer 3 and the membrane layer 2 to be increased. Additionally, by virtue of the fact that the micro-mirrors 5 are supported against the stresses induced by the buried oxide layer 6 thinner membrane layers can be used, thus resulting in thinner micro-mirrors or other micro-mechanical components which permits a reduction of the voltages and power necessary to tilt the micro-mirrors or to otherwise operate the micro-mechanical devices.

However, when the support layer comprises an oxide layer deposited by a TEOS deposition process, since TEOS deposition processes require processing temperatures in excess of 300° C., and since metallisation cannot withstand temperatures in excess of 300° C., the TEOS deposition process for depositing the support layer is unsuitable in semiconductor wafers where the micro-mirrors 5 must be metallised on the face onto which the support layer is to be deposited prior to deposition of the support layer. In such cases metallisation must deferred to a later stage in the process. Another disadvantage of deposition of the support layer by the TEOS deposition process is that a wet release is required for removing the deposited support layer.

It has been found that the use of the combination of an oxide support layer and a polysilicon support layer enhances the mechanical strength imparted by the support layers for supporting the bridging portions of the buried oxide layer, the micro-mirrors and the tethers, and furthermore, allows larger arrays of micro-mirrors or other micro-mechanical components to be fabricated. So far, semiconductor wafers with arrays of eight to greater than one thousand micro-mirrors arranged in rows of one to forty micro-mirrors and columns of eight to forty micro-mirrors with the micro-mirrors being of 500 μm to 2,000 μm in diameter arranged at spacings of 700 μm to 3,000 μm centre to centre have been fabricated successfully by the method according to the invention.

While the silicon wafer of the second support layer 53 has been described as being laminated to the oxide layer of the first support layer by fusion bonding, and has been described as subsequently forming an integral part of the semiconductor wafer 50, it is envisaged that the silicon wafer of the second support layer may be bonded to the first support layer temporarily by a suitable temporary bonding process, and would be removed subsequently. Since in such a case the silicon wafer of the second support layer would only be required for temporarily acting as a support, it is envisaged that in general, the silicon wafer of the second support layer would not require patterning, and the etching of the access openings therethrough, and would thus be removed after the exposed portions of the buried oxide layer exposed by the through bores 9 had been removed. Once the silicon wafer of the second support layer had been removed, the first support layer would then be removed.

While the oxide of the support layers has been described as being deposited by chemical vapour deposition processes and by a TEOS deposition process, any suitable deposition process for depositing the oxide of the support layers may be used. It will also be appreciated that the oxide support layers instead of being deposited, may be grown by any suitable growing process, for example, a thermal growing process. Needless to say, the buried oxide layer 6 may be deposited or grown, and may be deposited or grown on either the membrane layer or the handle layer, and then bonded to the other of the membrane layer and the handle layer.

While the exposed portions of the buried oxide layer 6 have been described as being removed before the support layer or the first support layer, it is envisaged that in certain cases where convenient the support layer or the first support layer, as the case may be, may be removed simultaneously with the exposed portions of the buried oxide layer 6. This would be particularly so where the support layer or the first support layer, as the case may be, is an oxide layer.

While the micro-mechanical components have been described as being micro-mirrors in the embodiments of the invention described with reference to the drawings, the method according to the invention may be used in conjunction with any other type of micro-mechanical components formed in a semiconductor wafer.

While the support layers have been described as being of oxide, photo-resist, or polysilicon wafer, the support layers may be of any other suitable material capable of providing the support required.

It is also envisaged that where the second support layer is provided as a polysilicon layer, the polysilicon layer could subsequently form part of the semiconductor wafer, and in which case, it is envisaged that access openings would be provided through the polysilicon layer to the micro-mechanical components, although in certain cases such access openings may not be required.

While membrane layers of specific thickness have been described, it is envisaged that the membrane layers may be of any depth in the range of 2 μm to 30 μm, and in certain cases, may be even up to 50 μm.

While in the embodiments of the invention described the buried oxide layer may be formed on the membrane layer or the handle layer, and then bonded to the other of the two layers, in certain cases, it is envisaged that the buried oxide layer may be formed on both the membrane layer and the handle layer, and the respective oxide layers would then be bonded together to form the buried oxide layer.

The invention claimed is:

1. A method for forming a micro-mechanical component in a semiconductor wafer comprising a membrane layer supported on a handle layer with a buried insulating layer disposed between the membrane layer and the handle layer, the micro-mechanical component being formed in the membrane layer, and a communicating opening extending through the handle layer and the buried insulating layer exposing the micro-mechanical component, the method comprising the steps of:

forming at least one trench extending through the membrane layer for defining the micro-mechanical component therein, each trench exposing a portion of the buried insulating layer bridging the trench, and applying a support layer to each bridging portion of the buried insulating layer, the support layer extending across each trench, and being applied to each bridging portion of the buried insulating layer prior to the bridging portion being exposed by the communicating opening through the handle layer for supporting the bridging portion for preventing rupturing of the buried insulating layer when the buried insulating layer is exposed by the communicating opening through the handle layer.

2. A method as claimed in claim 1 in which the support layer is applied to each bridging portion of the buried insulating layer by back filling the corresponding trench formed in the membrane layer with material for forming the support layer.

3. A method as claimed in claim 1 in which the support layer is applied to the surface of the micro-mechanical component in a plane parallel to the plane of the exposed surface of the membrane layer for preventing bowing of the micro-mechanical component when the communicating opening has been formed in the handle layer, and prior to the buried insulating layer adjacent the micro-mechanical component exposed by the communicating opening being removed.

4. A method as claimed in claim 1 in which the support layer is applied to the entire exposed surface of the micro-mechanical component.

5. A method as claimed in claim 1 in which the support layer is applied to the exposed surface of the membrane layer adjacent the micro-mechanical component.

6. A method as claimed in claim 1 in which the support layer is applied to the entire exposed surface of the membrane layer.

7. A method as claimed in claim 1 in which the support layer is deposited.

8. A method as claimed in claim 1 in which the support layer is an oxide support layer.

9. A method as claimed in claim 8 in which the depth of the oxide support layer is in the range of 0.4 μm to 2 μm.

10. A method as claimed in claim 9 in which the depth of the oxide support layer is in the order of 1 μm.

11. A method as claimed in claim 1 in which the support layer is of photo-resist material.

12. A method as claimed in claim 11 in which the depth of the photo-resist support layer is in the range of 1 μm to 10 μm.

13. A method as claimed in claim 12 in which the depth of the photo-resist support layer is in the order of 5 μm.

14. A method as claimed in claim 1 in which the support layer comprises a first support layer, and a second support layer applied over the first support layer.

15. A method as claimed in claim 14 in which the first support layer is an oxide layer.

16. A method as claimed in claim 15 in which the oxide of the first support layer is deposited.

17. A method as claimed in claim 16 in which the first support layer of oxide is of depth in the range of 0.4 μm to 1.5 μm.

18. A method as claimed in claim 17 in which the first support layer of oxide is of depth in the order of 1 μm.

19. A method as claimed in claim 14 in which the second support layer is a silicon based layer.

20. A method as claimed in claim 19 in which the second support layer is a deposited layer.

21. A method as claimed in claim 19 in which the second support layer is a polysilicon layer.

22. A method as claimed in claim 21 in which the second support layer of polysilicon is of depth in the range of 1 μm to 10 μm.

23. A method as claimed in claim 22 in which the second support layer of polysilicon is of depth in the order of 4 μm.

24. A method as claimed in claim 19 in which the second support layer comprises a silicon wafer bonded to the first support layer.

25. A method as claimed in claim 24 in which the second support layer in the form of a silicon wafer, while it is acting as a support layer is of depth in the range of 5 μm to 100 μm.

26. A method as claimed in claim 25 in which the second support layer in the form of a silicon wafer, while it is acting as a support layer is of depth in the order of 20 μm.

27. A method as claimed in claim 14 in which an access opening is etched through the second support layer for providing access to the micro-mechanical component through the second support layer, and the portion of the first support layer adjacent the micro-mechanical component is removed through the access opening.

28. A method as claimed in claim 1 in which the portion of the buried insulating layer exposed by the communicating opening and the support layer are removed when the communicating opening has been formed in the handle layer.

29. A method as claimed in claim 28 in which the portion of the buried insulating layer exposed by the communicating opening is removed before the support layer is removed.

30. A method as claimed in claim 28 in which the support layer and the portion of the buried insulating layer exposed by the communicating opening are simultaneously removed.

31. A method as claimed in claim 1 in which the micro-mechanical component is a micro-mirror supported in the membrane layer by a pair of tethers located on opposite sides of the micro-mirror for defining a pivot access about which the micro-mirror is tiltable.

32. A method as claimed in claim 1 in which the depth of the membrane layer is in the range of 2 μm to 30 μm.

33. A method as claimed in claim 1 in which the depth of the membrane layer is in the order of 3 μm.

34. A method as claimed in claim 1 in which the buried insulating layer is of depth in the range of 0.2 μm to 1 μm.

35. A method as claimed in claim 1 in which the buried insulating layer is in the order of 0.4 μm.

* * * * *